United States Patent [19]
Ueda

[11] Patent Number: 5,973,680
[45] Date of Patent: Oct. 26, 1999

[54] MOTION PICTURE RETRIEVAL SYSTEM

[75] Inventor: Hiroaki Ueda, Tokyo, Japan

[73] Assignee: NEC Corporation, Tokyo, Japan

[21] Appl. No.: 08/597,398

[22] Filed: Feb. 8, 1996

[30] Foreign Application Priority Data

Feb. 9, 1995 [JP] Japan ................................. 7-021628

[51] Int. Cl.⁶ ......................................................... H04N 7/10
[52] U.S. Cl. ............................... 345/327; 348/6; 348/7; 348/12; 348/13; 455/3.1; 455/5.1
[58] Field of Search ........................... 348/1, 10, 7, 13, 348/12, 6, 8; 455/6.2, 6.3, 4.2, 5.1, 6.1, 2; 395/200.09, 10

[56] References Cited

U.S. PATENT DOCUMENTS

| | | | |
|---|---|---|---|
| 4,138,718 | 2/1979 | Toke et al. ............................ | 364/136 |
| 5,400,402 | 3/1995 | Garfinkle .................................... | 348/7 |
| 5,416,508 | 5/1995 | Sakuma et al. ............................ | 455/2 |
| 5,483,278 | 1/1996 | Strubbe et al. ............................. | 348/7 |
| 5,485,197 | 1/1996 | Hoarty ....................................... | 348/7 |
| 5,539,449 | 7/1996 | Blahut et al. .............................. | 348/7 |
| 5,585,865 | 12/1996 | Amano et al. ............................. | 348/1 |
| 5,619,247 | 4/1997 | Russo ........................................ | 348/10 |
| 5,619,249 | 4/1997 | Billock et al. .............................. | 348/7 |
| 5,640,453 | 6/1997 | Schuchman et al. ..................... | 455/6.2 |
| 5,657,072 | 8/1997 | Aristides et al. ......................... | 455/6.2 |
| 5,659,350 | 8/1997 | Hendricks et al. ........................ | 348/6 |
| 5,663,757 | 9/1997 | Morales .................................... | 455/6.2 |

FOREIGN PATENT DOCUMENTS

| | | |
|---|---|---|
| 0 625 856 | 11/1994 | European Pat. Off. . |
| 60-22243 | 2/1985 | Japan . |
| 61-120567 | 6/1986 | Japan . |
| 63-214092 | 9/1988 | Japan . |
| 64-70826 | 3/1989 | Japan . |
| 1-295363 | 11/1989 | Japan . |
| 3-3476 | 1/1991 | Japan . |
| 5-54085 | 3/1993 | Japan . |
| 5-31479 | 4/1993 | Japan . |
| 5-122279 | 5/1993 | Japan . |
| 95 01057 | 1/1995 | WIPO . |

OTHER PUBLICATIONS

IEEE Multimedia, Fall 1994, vol. 1, No. 3, pp. 14–24, Little et al, Prospects for Interactive Video–on–Demand.

IBM Technical Disclosure Bulletin, vol. 37, No. 10, Oct. 1994, pp. 201–202, Anonymous, "Improved Multimedia Response using Neural Net Prediction".

*Primary Examiner*—John K. Peng
*Assistant Examiner*—Linus Lo
*Attorney, Agent, or Firm*—Foley & Lardner

[57] ABSTRACT

Upon a reception of a request for connection from a terminal unit, a server sends a start menu screen for video selection. A video selection range is narrowed by changing menu screens. When a certain menu screen is reached, a history table is accessed to read frequencies of use of a plurality of corresponding videos. Heading parts of frequently used videos are sent to the terminal unit, where they are stored in a terminal memory. With a final selection of a video, its heading part is read from the terminal memory, to be reproduced. A desired video quickly starts. The remaining part of the video is sent from the server.

6 Claims, 15 Drawing Sheets

[ SELECTION OF TITLE ]

[ REPRODUCTION OF SELECTED VIDEO ]

F I G. 14
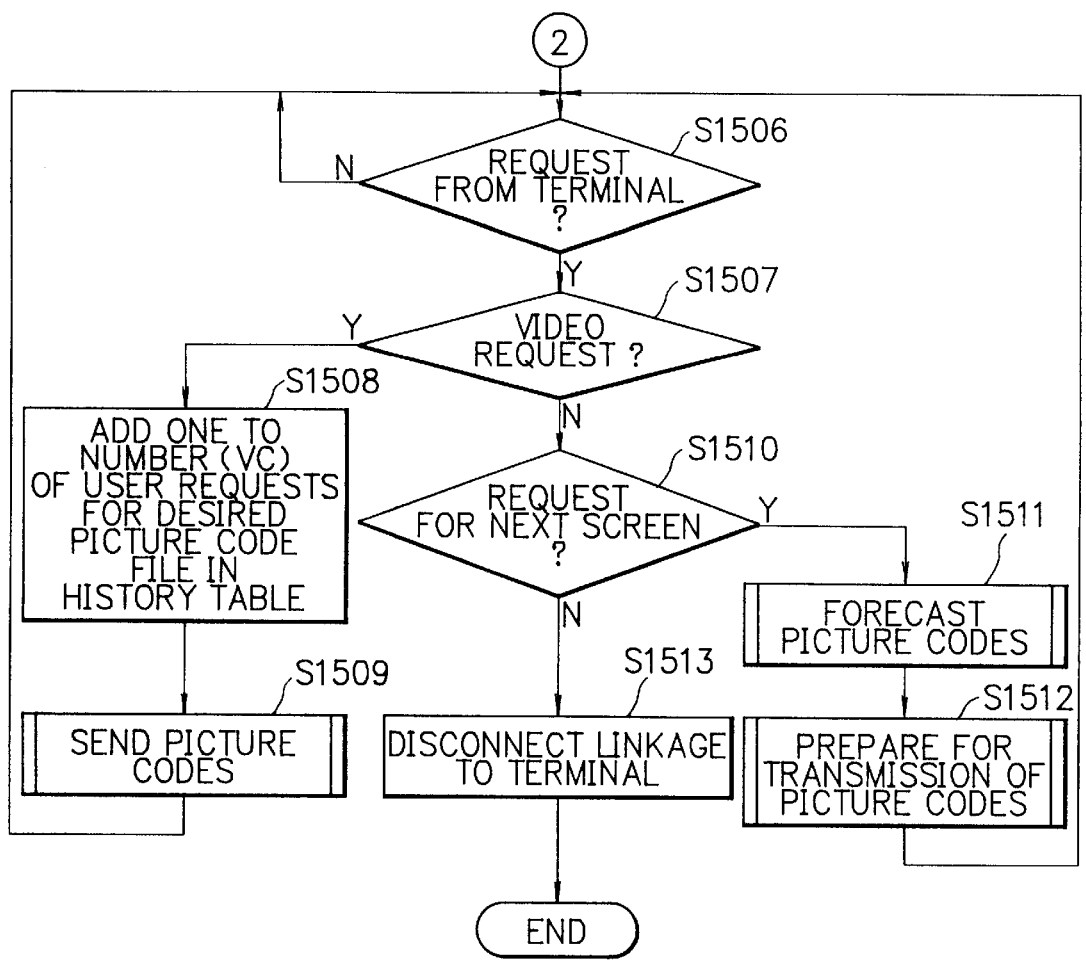

MOTION PICTURE RETRIEVAL SYSTEM

BACKGROUND OF THE INVENTION

The present invention generally relates to a motion picture retrieval system, and particularly, to a motion picture retrieval system in which, upon a reception of a request transmitted from a terminal unit through a bidirectional communication line, a video server is responsible for the request to retrieve requested video information and to transmit retrieved video information through the communication line to the terminal unit.

DESCRIPTION OF THE PRIOR ART

In communications for transmitting pictures through a communication line, the pictures typically are converted into digital data before the transmission. In most cases, such digital data includes a very large quantity of information and hence are compressed to be coded in accordance with an applicable compression coding system such as by the JPEG (Joint Photographic Expert Group) or MPEG (Moving Pictures Expert Group). As typical examples using such a compression technique for picture data transmission, we already have a television conference, a community antenna television (CATV, cable television) and a video on demand (VOD) system.

FIG. 1 is a block diagram of a conventional motion picture retrieval system using a bidirectional communication line. In FIG. 1, shown at the left is a terminal unit 11, and the right is a server unit 21 for providing video information to the unit 11. The terminal unit 11 includes terminal control means 12 such as a central processing unit (CPU) for controlling an input section 13, a terminal communication section 14, a terminal memory 15 and a motion picture decoder section 16. The input section 13 is implemented for the user to select a desired video as a request to the server 21. The communicating unit 14 communicates via a communication line 31 with the server 21. The memory 15 is a storage means for storing therein information received from the server 21. The decoder unit 16 serves as a means for decoding compressed codes of motion pictures.

The server unit 21 includes server control means 22 similarly including a CPU or the like. The means 22 supervises a server communication section 23, a server memory 24, and a motion picture code file section 25. The communicating section 23 is linked with the line 31 to carry out communications with the terminal 11. The memory 24 is a storage means to temporarily store therein a file including encoded information of the desired motion picture. The file section 25 is a storage means to store therein various files including compressed motion picture codes.

In the conventional motion picture retrieval system of this type, when the user selects and inputs a request for a desired video from the input section 13 of the terminal 11, the communication section 14 transmits the request via the line 31 to the server machine 21. The server 21 responsively retrieves the desired video, i.e., a motion picture code file from the file section 25 to store the video in the memory 24 and then sends the video via the communicating section 23 to the terminal 11. On receiving the video, the terminal 11 stores the motion picture code file of the video in the memory 15 such that the decoder section 16 decodes the file to reproduce original video information.

FIGS. 2 to 5 show an example of the flow of operations presented on a display screen of the terminal when a video is selected on the terminal side in the conventional moving picture retrieval system. FIG. 2 shows a menu screen 41 including a video service button (a pictorial symbol or an icon) 42 for selecting a video service, a television (TV) service button 43 for choosing a television program, and a game service button 44 for indicating a game service. The user selects one of the buttons via another input means such as a pointing device including a mouse, not shown. In this case, the video service button 42 is to be chosen.

FIG. 3 shows an image displayed on the screen when the video service button 42 is pushed. The video portion is enlarged by a presenting function, and the screen is changed to a genre selection screen 46. This image includes genre selection buttons 47 respectively related to, for example, "love", "comedy", "action", and "science fiction (S.F.)". The system then enters a wait for state, where it waits another select operation by the user.

FIG. 4 shows a video title screen 48 displayed when one of the buttons 47 is depressed. The screen image 48 includes a plurality of titles of the associated genre. The user chooses a desired title by depressing the relevant title selection button 49 and then pushes a reproduction button 50.

FIG. 5 shows a state of the screen in which a video reproduction screen 51 is displayed. Displayed in this screen are reproduced images of the video piece having the selected title.

As above, the conventional system provides menus in a hierarchical structure so that the user selects a desired item from a plurality of videos. In this system, however, the video of the motion picture file desired by the user is retrieved from a large number of motion picture code files stored in such a storage of the server machine as a motion picture code file section. Consequently, there is required quite a long period of time from when a video request is issued from the terminal to when the desired video is sent thereto. This consequently leads to a problem that the video desired by the user cannot be reproduced immediately after the video request is issued to the server.

In this situation, to overcome the above problem, there has been proposed a first technology in the Japanese Patent Laid-Open Publication No. 63-214092. In accordance with the proposal, video information desired by the user is beforehand registered to the system by the terminal side such that the terminal side receives the image information from the server side and accumulates the information in a storage prior to initiation of the system operation. As a result, when the user issues a request for desired image information, it is possible to reproduce the image information immediately thereafter on the terminal side.

Additionally, in accordance with the Japanese Patent Laid-Open Publication No. 61-120567, there has been described a second proposal in which the video retrieval is accomplished while visually checking title information produced by minimizing image information in size and wide title information prepared by further minimizing the size of title information. This facilitates the retrieval of desired image information.

Furthermore, there has been described a third proposal in the Japanese Patent Laid-Open Publication No. 5-54085. In this proposal, historical information is produced for motion picture files accessed in the past. Namely, a priority level is set to historical information of each file by assigning a weight thereto according to such an operation mode applied thereto as "slow scan", "play", or "fast scan". This makes it possible to increase the speed of operation to retrieve and display the desired motion picture.

In addition, the Japanese Utility Model Laid-Open Publication No. 5-31479 has offered a fourth proposal in which a plurality of screen images are concurrently accessed to reduce the period of time to be consumed from the retrieval of the video to the reproduction thereof.

In accordance with the first proposal, image information is required to be stored in the terminal side in advance and hence a storage having a large capacity is necessary to satisfactorily cope with users' requests. Additionally, the image information is required to be registered to the system in advance so that the registered information is sent to the terminal side as described above. Consequently, there arises a problem of complexity of the overall system configuration.

Moreover, in regard to the second proposal, the retrieval of desired video information is facilitated due to the adoption of the title information configured in two levels. However, the operation procedure ranging from the retrieval of video information to the presentation of the video information transmitted from the server side is substantially the same as for the first proposal. This means that the period of time to be lapsed from when the video request is issued to when the video is displayed on the terminal side cannot be minimized. In accordance with the third proposal, although the retrieval and display of the desired motion picture can be conducted similarly at a higher speed, the period of time to be consumed by when the desired video is displayed on the terminal side cannot be reduced as in the case of the second proposal.

Furthermore, in the fourth proposal, a plurality of screen images are accessed in a concurrent fashion to decrease the period of time from the retrieval of a desired video to the presentation thereof. For this purpose, there are required system constituent components developing a high performance, which disadvantageously leads to a problem that the system configuration becomes complicated.

SUMMARY OF THE INVENTION

It is therefore an object of the present invention to provide a motion picture retrieval system in which the user need not register videos desired by the user for reproduction thereof and a video for which a request is issued from a terminal can be reproduced on the terminal side in a short period of time after the issuance of the video request.

To solve the problem above in accordance with a first aspect of the present invention, there is provided a motion picture retrieval system including video selecting means for finally enabling selection of a desired video by sequentially narrowing a range of videos for selection in a direction from a coarser classification of videos to a finer classification thereof, history information deciding means operative when a plurality of videos remain in a final video selection range as a result of operation of the video selecting means for deciding as history information for each of the videos a frequency of selecting operations for the video in the past, and video selection forecasting means for forecasting as a finally selected video or videos one video or a plurality of videos decided to have a higher selection frequency as a result of operation of the history information deciding means.

Namely, in accordance with the first aspect, the range of videos for selection is sequentially narrowed in a direction from a coarser classification of videos to a finer classification thereof. From a plurality of videos remaining in a stage before a final video selection stage, there is or are forecasted according to a selection frequency thereof in the past one video or a plurality of videos for the pertinent selection. Consequently, an operation to obtain the forecasted video or videos can be commenced at this point of time. If the forecast is appropriate, the period of time lapsed from when the requested video is obtained to when the video is reproduced can be minimized when compared with a case in which the video is attained after the video selection is completely achieved for all videos.

In accordance with a second aspect of the present invention, there is provided a motion picture retrieval system including categorized video selection frequency storage means for storing for each category of videos a frequency of selecting operations of each video in the past, category specifying means for specifying a category of videos for selection, and video selection forecasting means operative when a category of videos for selection is specified by the category selecting means for forecasting as a finally selected video or videos one video or a plurality of videos decided to have a highest selection frequency among videos belonging to the category as a result of operation of the categorized video selection frequency storage means.

That is, in the second aspect of the present invention, there is adopted categorized video selection frequency storage means in which a frequency of selecting operations of each video in the past is stored for each category of videos. When a category is specified, there is or are forecasted as a finally selected video or videos one video or a plurality of videos decided to have a highest selection frequency among videos belonging to the category. Also in this case, the video can be obtained before the final video selection to prepare for transmission and reproduction of the video and hence the period of time consumed from when the requested video is obtained to when the video is reproduced can be decreased.

In accordance with a third aspect of the present invention, the motion picture retrieval system in accordance with the first or second aspect further includes forecasted video transmitting means for transmitting a portion or all of videos forecasted by the video selection forecasting means from a server side in which the videos are stored to a terminal side in which the transmitted videos are reproduced and the videos are transmitted before a final selection of videos is conducted and motion picture reproduction preparing means for conducting preparation for reproduction of videos sent from the forecasted video transmitting means.

In the third aspect, a portion or all of videos forecasted by the video selection forecasting means is or are sent from a server side to a terminal side so that when a video is finally selected, the video can be immediately reproduced on the terminal side. When portions of the forecasted videos are sent to the terminal, the period of time necessary for the transmission thereof is minimized. Moreover, even when the memory capacity is limited on the terminal side, it is allowed to transmit portions of several candidate videos to the terminal. In a case in which a long period of time is required to finally select a video or the video is transmitted to the terminal in relatively a short period of time, all videos may be transmitted to the terminal beginning at a video having the highest priority level.

In accordance with a fourth aspect of the present invention, in the motion picture retrieval system in accordance with the third aspect, the forecasted video transmitting means transmits to the terminal side a leading portion of each of the videos of which selection is forecasted. When a final selection of videos is carried out, the forecasted video transmitting means transmits to the terminal side remaining portions of the finally selected video while the leading portion associated with the selected video is being reproduced.

In short, according to the fourth aspect, sent to the terminal is only a leading portion of each of the videos of which selection is forecasted. While the leading portion associated with the finally selected video is being reproduced, remaining portions of the video are transmitted to the terminal, thereby reducing the period of time lapsed by when the video is reproduced and enabling the continuous reproduction of the video.

In accordance with a fifth aspect of the present invention, in the motion picture retrieval system in accordance with the third aspect, the terminal side notifies the server side, before the forecasted video transmitting means transmits videos, a receivable memory capacity available for reception of videos on the terminal side.

In the fifth aspect, since a receivable memory capacity available for reception of videos on the terminal side is notified from the terminal side to the server side, it is possible to appropriately send several forecasted videos in consideration of an overflow condition of the memory capacity.

In accordance with a sixth aspect of the present invention, in the motion picture retrieval system in accordance with the third aspect, the server and terminal sides conduct bidirectional communication therebetween and the video selecting means sequentially narrows a range of videos for selection in a direction from a coarser classification of videos to a finer classification thereof by conducting a switching operation between menu screens and each of the menu screens is transmitted from the server side to the terminal side in response to a request from the terminal side.

Namely, in accordance with the sixth aspect, when the menu screen switching is conducted on the terminal side to narrow the video selection range, the terminal side sequentially issues a request to the server side for the screens. As a result, the operational load on the terminal side is mitigated and the video selection can be forecasted on the server side while recognizing the video selecting operation.

BRIEF DESCRIPTION OF THE DRAWINGS

The objects and features of the present invention will become more apparent from the consideration of the following detailed description taken in conjunction with the accompanying drawings in which:

FIG. 14 is a flowchart showing the last-half portion of the operation of the server control means of FIG. 13;

DESCRIPTION OF THE PREFERRED EMBODIMENTS

Referring now to the accompanying drawings, description will be given in detail of an embodiment in accordance with the present invention.

Figure 1:
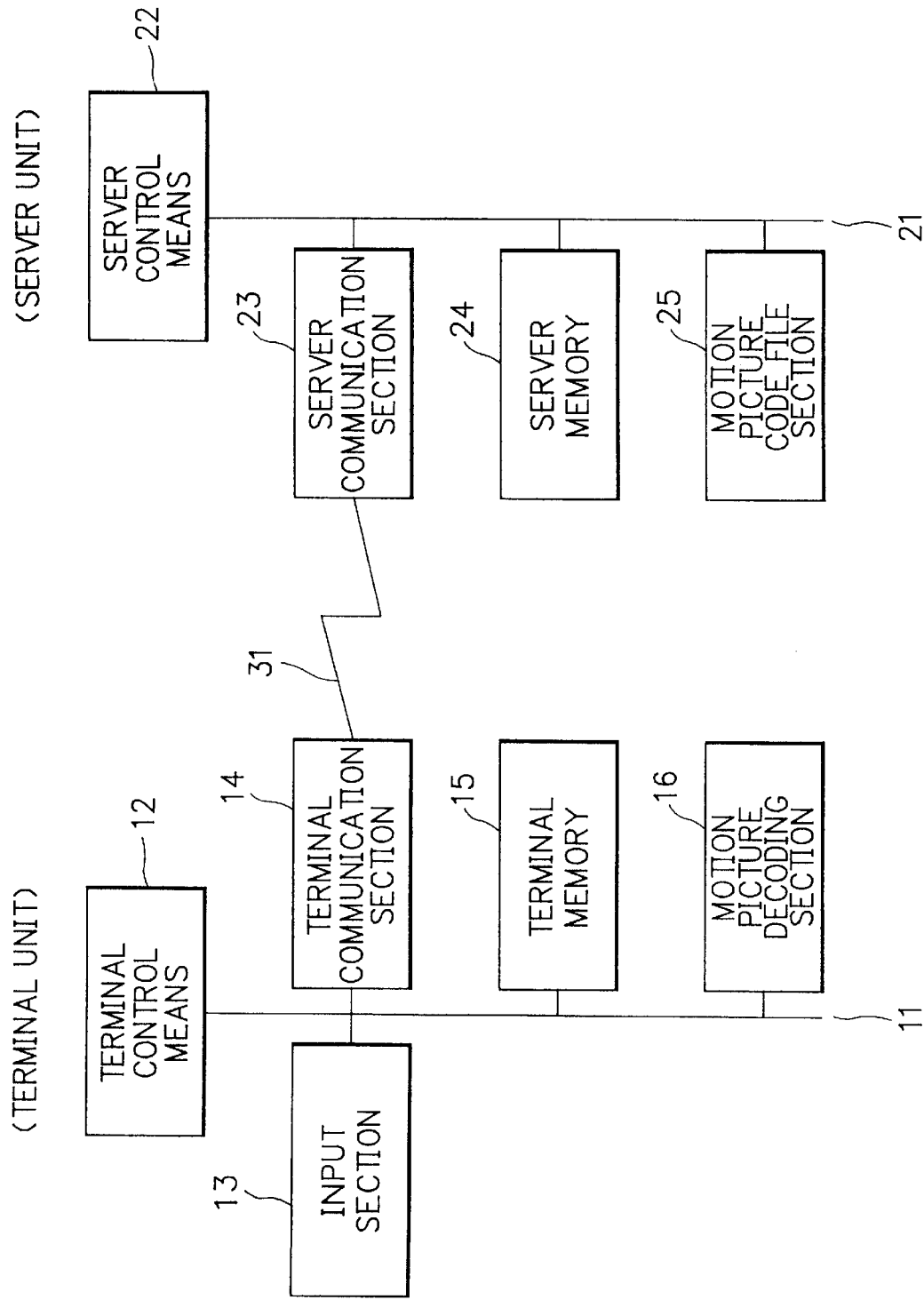
FIG. 1 is a schematic diagram showing the configuration of a conventional motion picture retrieval system using bidirectional communication.
Figure 2:
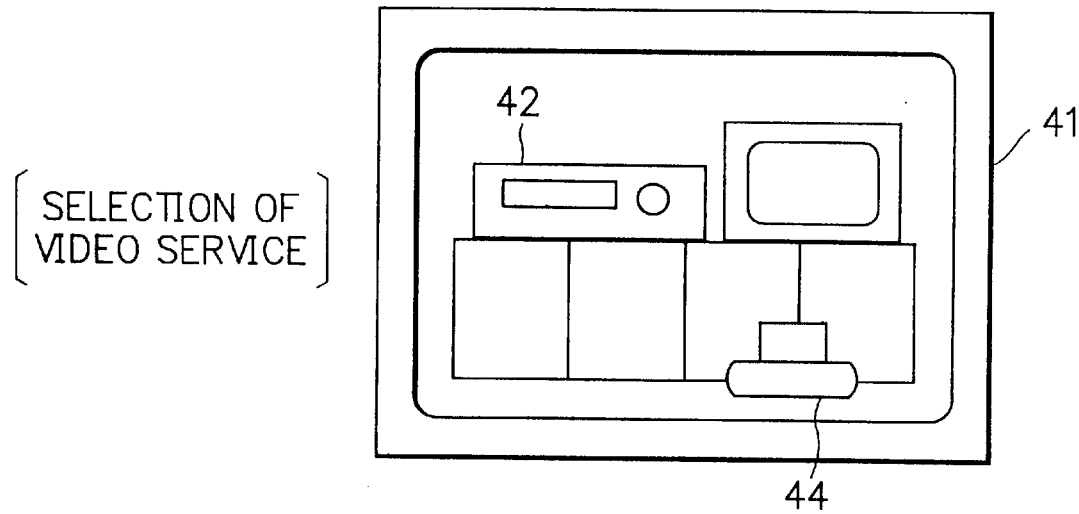
FIG. 2 is a diagram showing a menu screen to select a video on the terminal side of the conventional motion picture retrieval system.
Figure 3:
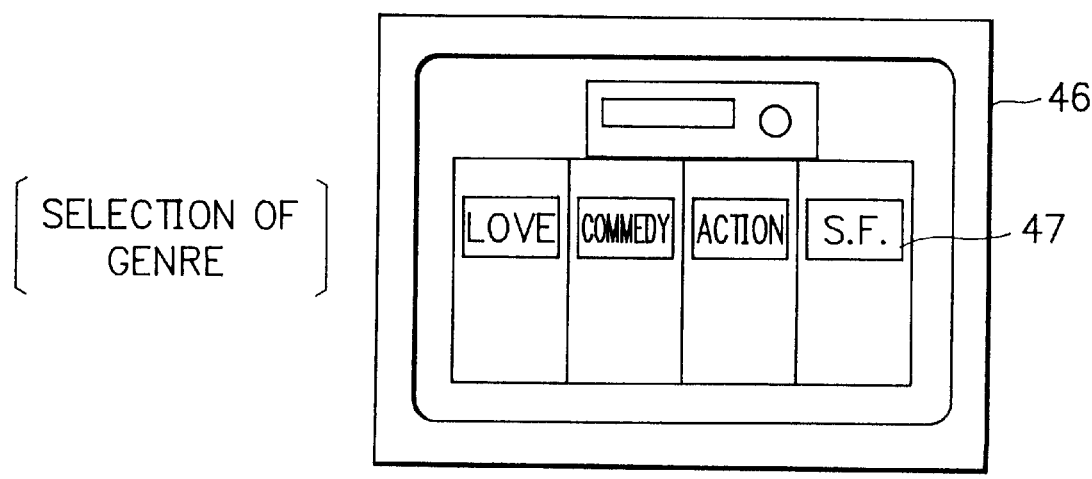
FIG. 3 is a diagram showing a genre selection screen displayed to select a genre after the screen of FIG. 2.
Figure 4:
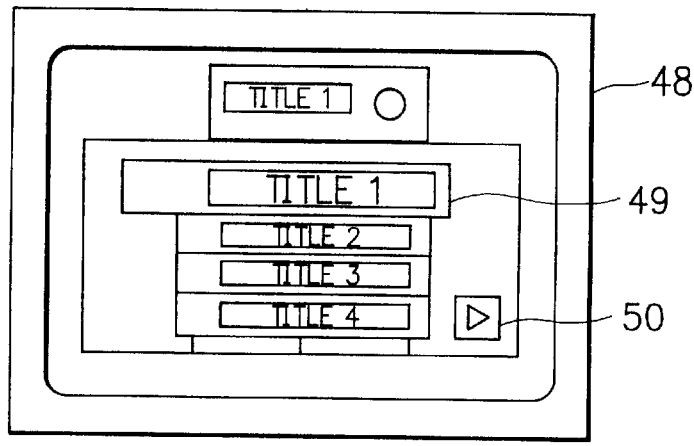
FIG. 4 is a diagram showing a title selection screen to be displayed after the screen of FIG. 3 to select a genre title.
Figure 5:
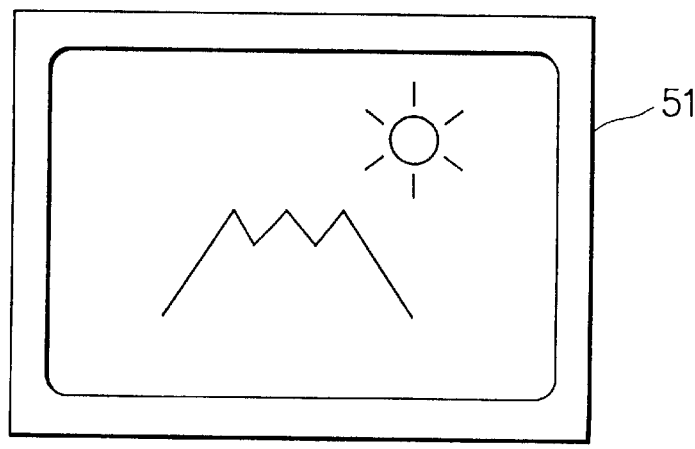
FIG. 5 is a diagram showing an example of a screen to be displayed after the screen of FIG. 4 to present reproduced images of the video having the selected title.
Figure 6:
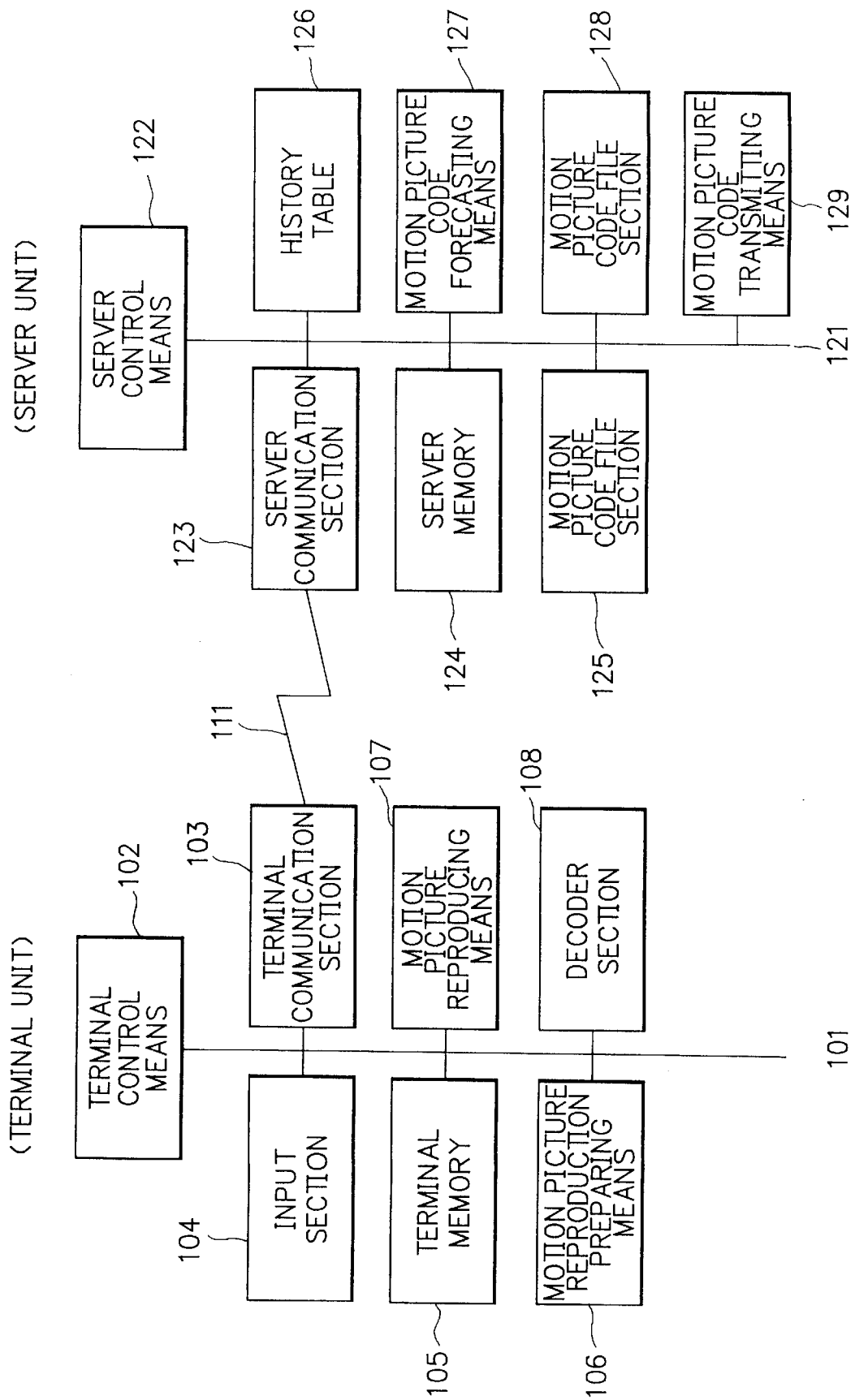
FIG. 6 is a diagram schematically showing the configuration of an embodiment of the motion picture retrieval system in accordance with the present invention.

FIG. 6 shows an outline of an embodiment of the motion picture retrieval system in accordance with the present invention. The configuration includes a terminal facility 101 coupled via a communication line 111 with a server machine 121. The terminal 101 includes terminal control means 102 including a CPU or the like. The control means 102 is connected to a terminal communication section 103 communicating via the line 111 with the server 121, an input section 104 to input indication selected by the user, a terminal memory 105 as recording media to store thereon motion picture codes of a plurality of motion pictures forecasted on the side of the server 121 and the contents of variables in execution, motion picture reproduction preparing means 106 to control storage of motion picture codes in the memory 105, motion picture reproducing means 107 to reproduce images of the video selected by the user, and a decoder section 108 to decode motion picture codes received from the server 121. The control means 102 thereby controls operations of the respective constituent components above.

The server machine 121 includes server control means 122 similarly including a CPU or the like. The control means 122 is connected to a server communication section 123 achieving communications via the line 111 with the terminal 101, a server memory 124 as recording media to store thereon the contents of variables in execution and predetermined motion picture codes, a motion picture code file section 125 to store therein motion picture code files including video information, a history table 126 to store therein selection frequency of each video desired by the user, motion picture code forecasting means 127 to forecast a video to be desired by the user according to the contents of the table 126, motion picture code transmission preparing means 128 to store motion picture codes in the memory 124 according to a sequence forecasted by the means 127 and thereby preparing the data for transmission, and motion picture code transmitting means 129 to send motion picture codes to the terminal 101. The control means 122 thereby supervises operations of these constituent components.

In the motion picture retrieval system, bidirectional communication is carried out via the line 111 between the communicating sections 103 and 123 respectively of the terminal 101 and the server 121. That is, when the terminal 101 requests a title menu screen to select a title of a desired motion picture, the server 121 sends several leading frames of motion picture codes of respective videos to the terminal 101 in an order forecasted by the forecasting means 127. In this operation, the means 127 assigns priority levels to videos in the title menu according to the history table 126 in which the number of requests in the past is written for each video.

The terminal 101 stores the motion picture codes from the server 121 in the memory 105 by the reproduction preparing means 106. Additionally, while sending a request of a video desired by the user to the server 121, the terminal starts reproducing motion picture codes stored in the memory 105 by use of the reproducing means 107. On receiving the video request, the server 121 transmits by the transmitting means 129 the remaining portion of motion picture codes of the video to the terminal 101. The terminal 101 receives the remaining motion picture codes of the video for the continuous reproduction thereof.

Figure 7:
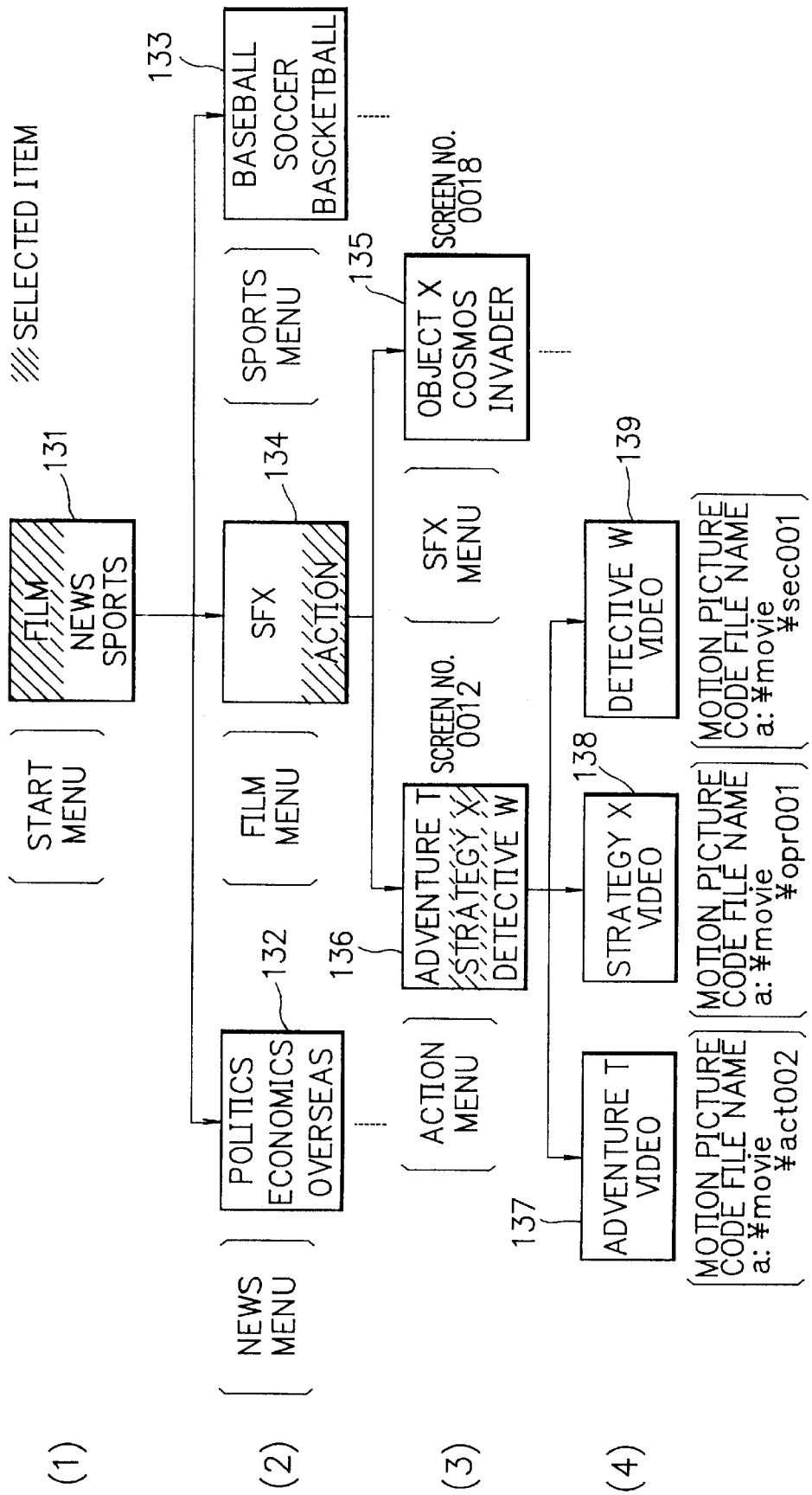
FIG. 7 is a diagram for explaining the hierarchical structure of video menus employed in the embodiment.

FIG. 7 shows the hierarchic structure of video menus adopted in the embodiment. First, there is displayed a start menu 131 from which the user select one of the general classification items including "film", "news", and "sports".

Assume that "news" is chosen by a mouse or a keyboard, not shown, of the input section 104 of FIG. 6. This causes presentation of a news menu 132 including menu items of "politics", "economics", and "overseas". When "sports" is chosen, there is displayed a screen of a sports news menu 133 including menu items of "baseball", "soccer", and "basketball".

When "film" is selected in the start menu 131, there is displayed a film menu 134 for the user to select therefrom "SFX" or "action". If "SFX" is chosen, an SFX menu 135 is presented; whereas, if "action" is selected, an action menu 136 is displayed. Assume that the screens respectively of SFX menu 135 and action menu 136 respectively have screen numbers "0018" and "0012".

In the action menu 136, the user selects "adventure T", "strategy X", or "detective W". Adventure T video 137, strategy X video 138, and detective W video 139 are respectively related to motion picture code file names respectively of, for example, a*¥movie¥act002, a*¥movie¥opr001, and a*¥movie¥sec001. As can be seen from this diagram, there is configured four hierarchical levels of menus as indicated by (1) to (4) ranging from the start menu 131 to the individual videos 137 to 139.

Figure 8:
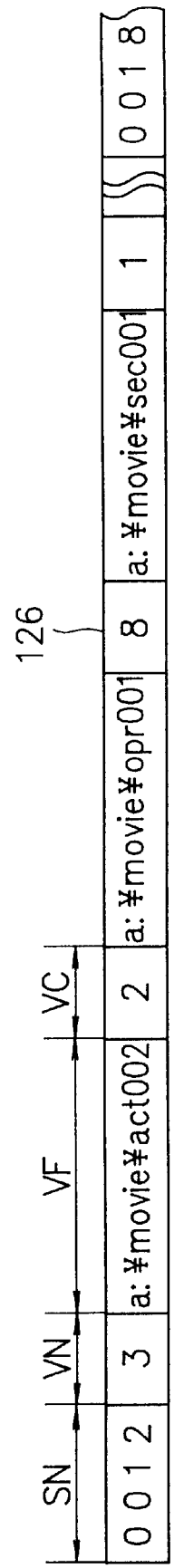
FIG. 8 is an explanatory diagram showing a portion of a historical table of the embodiment.

FIG. 8 shows a portion of the configuration of the history table 126, which is controlled according to each menu screen number. Namely, for each screen number, the table 126 includes a menu screen number SN, a number of motion picture code files VN for selection from the menu screen, a motion picture code file name VF to be selected from the menu screen, and a number of request operations VC desired by the user. This diagram shows the information items for menu screen number "0012". The number VN is set to three. In the of field of VC, there is stored a value desired by the user for each file name VF. In this example, it can be understood that file names a*¥movie¥act002, a*¥movie¥opr001, and a*¥movie¥sec001 respectively of the adventure T video 137, strategy X video 138, and detective W video 139 are respectively desired twice, eight times, and once in the past.

Since the menus are configured in the hierarchichical structure of FIG. 7, when "action" is selected in the menu at the hierarchical level indicated as (2), it is possible to forecast that the video desired by the user is "adventure T", "strategy X", or "detective W" in the screen having screen number "0012". Since the numbers VC of requests issued from the user respectively for these videos are two, eight, and one in the history table 126 shown in FIG. 8, the priority levels are possibly assigned to "strategy X video", "adventure T video", and "detective W video" in the descending priority order.

Figure 9:
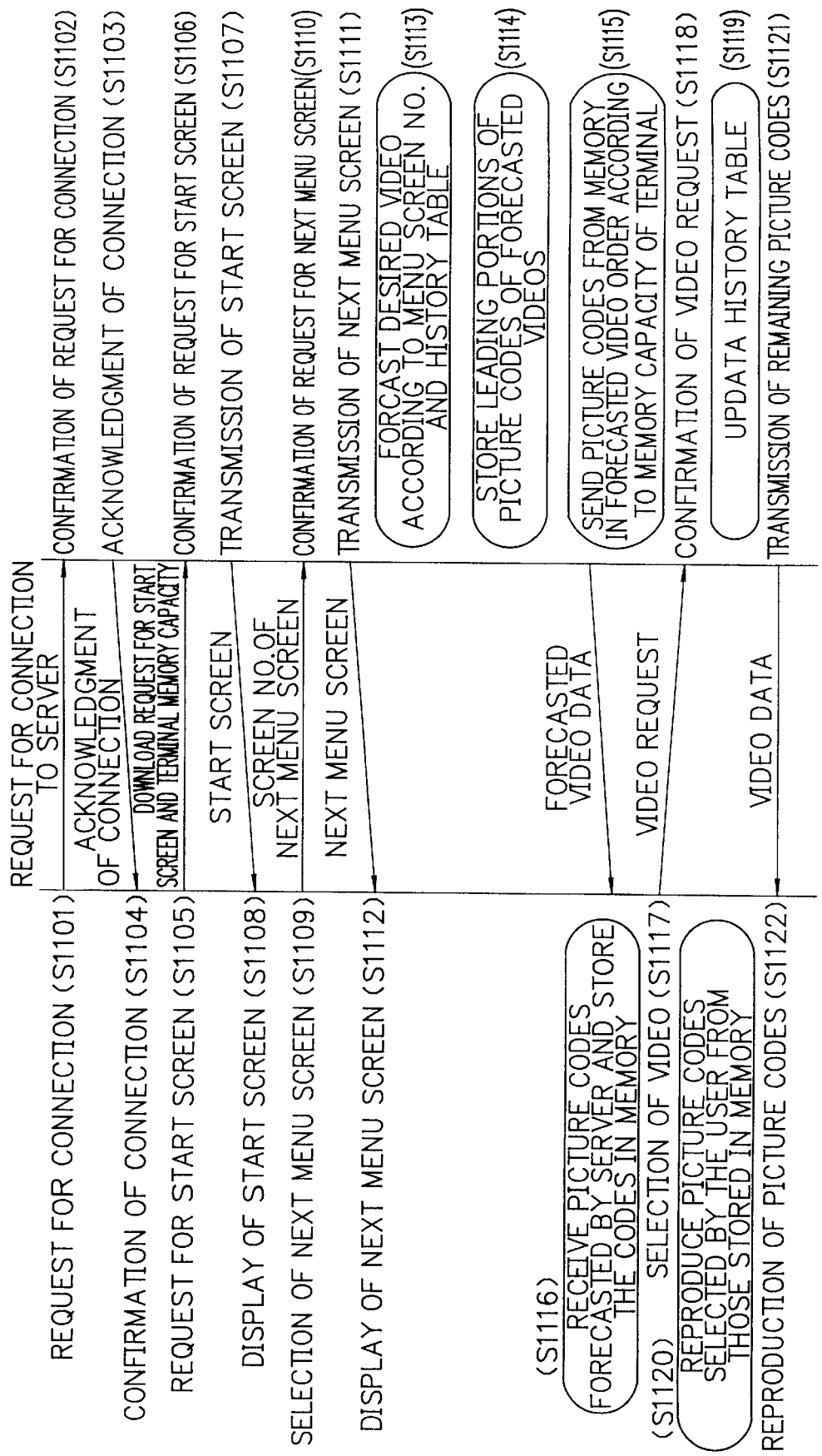
FIG. 9 is a sequence diagram showing an operation sequence of communications between a terminal and a server.

FIG. 9 shows an operation sequence of communications between the terminal unit 101 and the server machine 121. First, the terminal 101 issues a request for connection to the server 121 (step S1101). On receiving the center connection request (step S1102), the server 121 sends acknowledgment to the terminal 101 when the connection is possible (step S1103). The terminal 101 receives the acknowledgment message to confirm that the connection is established therebetween (step S1104).

Subsequently, the terminal 101 issues a request of download of a screen to display thereon the start menu 131 and notifies the memory capacity of the memory 105 to the server 121 (step S1105). The memory capacity notification is conducted because the server 121 is required to recognize, when sending information such as motion picture codes to the terminal 101, the capacity of data to be transmitted at a time. Confirming the request of the screen of start menu 131 and the like (step S1106), the server 121 sends the pertinent screen (step S1107). As a result, the start menu 131 is presented on the terminal 101 (step S1108).

When the user chooses a next menu screen in the menu 131 (step S1109), the screen number of the selected menu is sent from the terminal 101 to the server 121 so as to be confirmed by the server 121 (step S1110). The server 121 transmits the requested menu screen (step S1111). In response thereto, the terminal 101 displays the menu screen (step S1112).

After transmitting the menu screen in step S1111, the server 121 forecasts a desired video according to the menu screen number and the contents of the history table 126 (step S1113). The server 121 stores in the memory 124 a leading portion of the motion picture codes of each forecasted video (step S1114). According to the sequence of forecasted videos, the motion picture codes of the videos are sent from the server memory 124 to the terminal 101, the amount of codes to be transmitted being limited to the capacity of the terminal memory 105 (step S1115).

On receiving the picture codes, the terminal 101 stores the codes in the memory 105 (step S1116). On the other hand, the terminal 101 concurrently achieves a final video selection and issues a request for the selected video to the server 121 (S1117). Confirming the video request (step S1118), the server 121 updates the contents of the history table 126 (step S1119).

On the other hand, after the final video selection is accomplished, the terminal 101 selects and decodes the picture codes of the pertinent video stored in the memory 105 to start reproduction of the video (step S1120). According to the video request, the server 121 attains the remaining portion of the codes of the video from the code file section 125 and then sends the codes to the terminal 101 (step S1121). The terminal 101 sequentially receives the video data in the memory 105 such that the motion picture codes are continuously reproduced (step S1122).

As above, since the leading portion of the picture codes forecasted by the server 121 is received by the memory 105 while the user is selecting an item from the menu, it is possible to reproduce by the terminal 101 the portion immediately after the user's selection. Additionally, the video chosen by the user is notified to the server 121 and therefore the remaining portion of the pertinent video is accordingly transmitted to the terminal 101, which enables the subsequent portion of the video to be reproduced on the terminal 101.

Description has been briefly given of an embodiment the motion picture retrieval system according to the present invention. Next, control operations of the respective constituent elements of the system will be specifically described.

Figure 10:
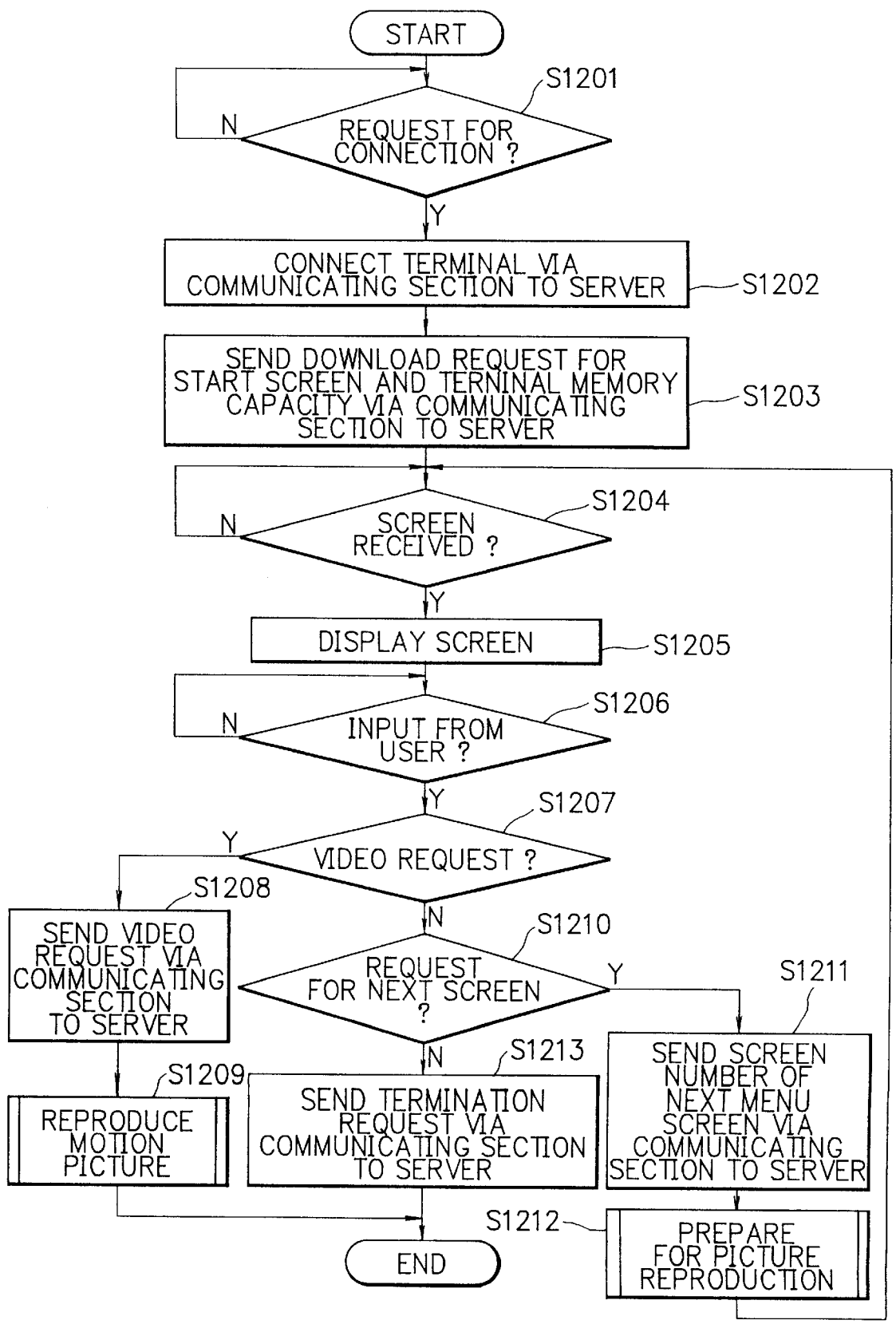
FIG. 10 is a flowchart showing operation of terminal control means to control the terminal.

FIG. 10 shows a flow of processing conducted by the terminal controller 102 to supervise the overall operation of the terminal 101. At occurrence of a request of connection to the server 121 (step S1201), the control means 102 establishes connection to the server 121 by the communication section 103 (step S1202). The terminal controller 102 then issues a download request to display the start menu 132 and notifies the capacity of the memory 105 via the communication section 103 to the server 121 (step S1203).

On receiving the requested screen thereafter (Y in step S1204), the controller 102 presents the screen image (step S1205). In this example, the screen of start menu 131 is displayed. In this state, the controller 102 monitors inputs from the user (step S1206). When a video request is received (Y in step S1207), for example, when "adventure T video" is chosen in a situation in which the action menu 136 is being presented in FIG. 7, the terminal controller 102 sends a request of the designated video via the communication section 103 to the server 121 (step S1208). In this case, the first portion of the picture codes has already been stored in the terminal 101 and hence motion pictures are reproduced therefrom (step S1209).

On the other hand, when the start menu 131 is presented, a request is issued for a screen at the next hierarchical level (Y in step S1210). On this occasion, the control means 102 sends a screen number of the next menu screen via the communicating section 103 (step S1211). Thereafter, the controller 102 starts an operation to prepare for the reproduction of motion pictures (step S1212). When a termination request is issued as a request other than the next screen request (N in step S1210), the controller 102 activates the communicating section 103 to send the termination request to the server 121 (step S1213), thereby terminating communication between the server 121 and the terminal 101.

Figure 11:
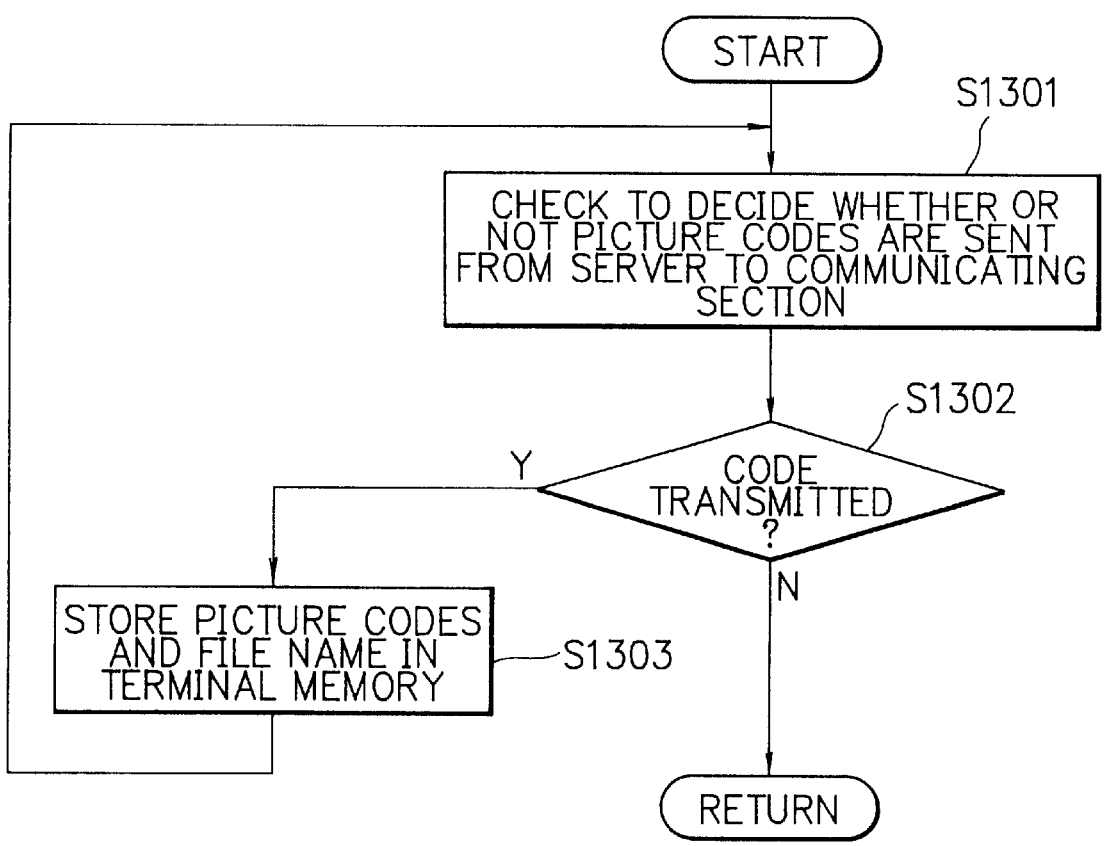
FIG. 11 is a flowchart showing operation of means for preparing reproduction of motion pictures on the terminal side.

FIG. 11 shows a processing flow of the motion picture reproduction preparing means 106. The means 106 is provided to receive motion picture codes forecasted by the server 121 and specifically checks whether or not there exist any motion picture codes sent from the server 121 to the terminal communicating section 103 (step S1301). If this is the case (Y in step S1302), the means 106 stores the picture codes and a file name related thereto in the terminal memory 105 (step S1303) and then passes control to step S1301 again. When such picture codes are missing (N in step S1302), the means 106 enters a wait state awaiting codes from the server 121 (Return).

Figure 12:
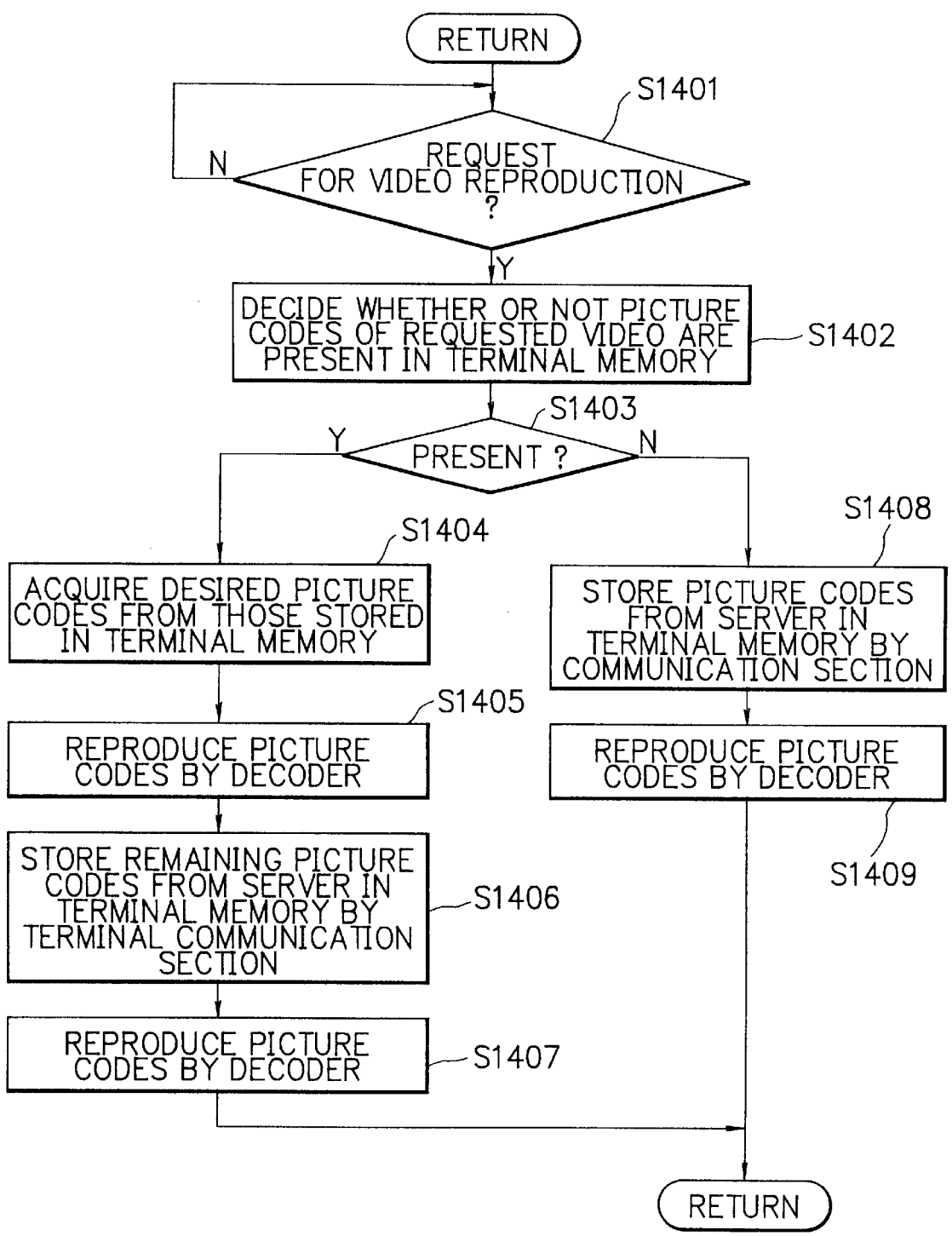
FIG. 12 is a flowchart showing operation of means for reproducing motion pictures on the terminal side.

FIG. 12 is a flowchart showing operation of the motion picture reproducing means 107. On receiving a request for video reproduction (Y in step S1401), the means 107 decides whether or not the picture codes requested from the user are present in the terminal memory 105 (step S1402). If the codes are present (Y in step S1403), the means 107 obtains the requested codes from the memory 105 (step S1404). The means 107 then sends the codes to the decoder section 108 so as to reproduce the decoded results (step S1405).

While the video reproduction is in process, the terminal communicating section 103 receives picture codes subsequent to the first portion of the pertinent video sent from the server 121. When the decoder 108 starts reproducing the first portion, the reproducing means 107 acquires the remaining portion of the picture codes from a receiving buffer, not shown, of the communicating section 103 and then stores the attained codes in the memory 105 (step S1406). When the reproduction of the first code portion is finished, the reproducing means 107 decodes and reproduces the subsequent picture codes (step S1407, Return).

On the other hand, when the video desired by the user is missing in the memory 105 (N in step S1403), the reproducing means 107 waits for the picture codes sent from the server 121 beginning at a first portion thereof in the same fashion as for the conventional system. When the codes are received, the means 107 stores the codes in the memory 105 (step S1408). The decoder 108 then decodes the codes to reproduce the video information (step S1409, Return).

Figure 13:
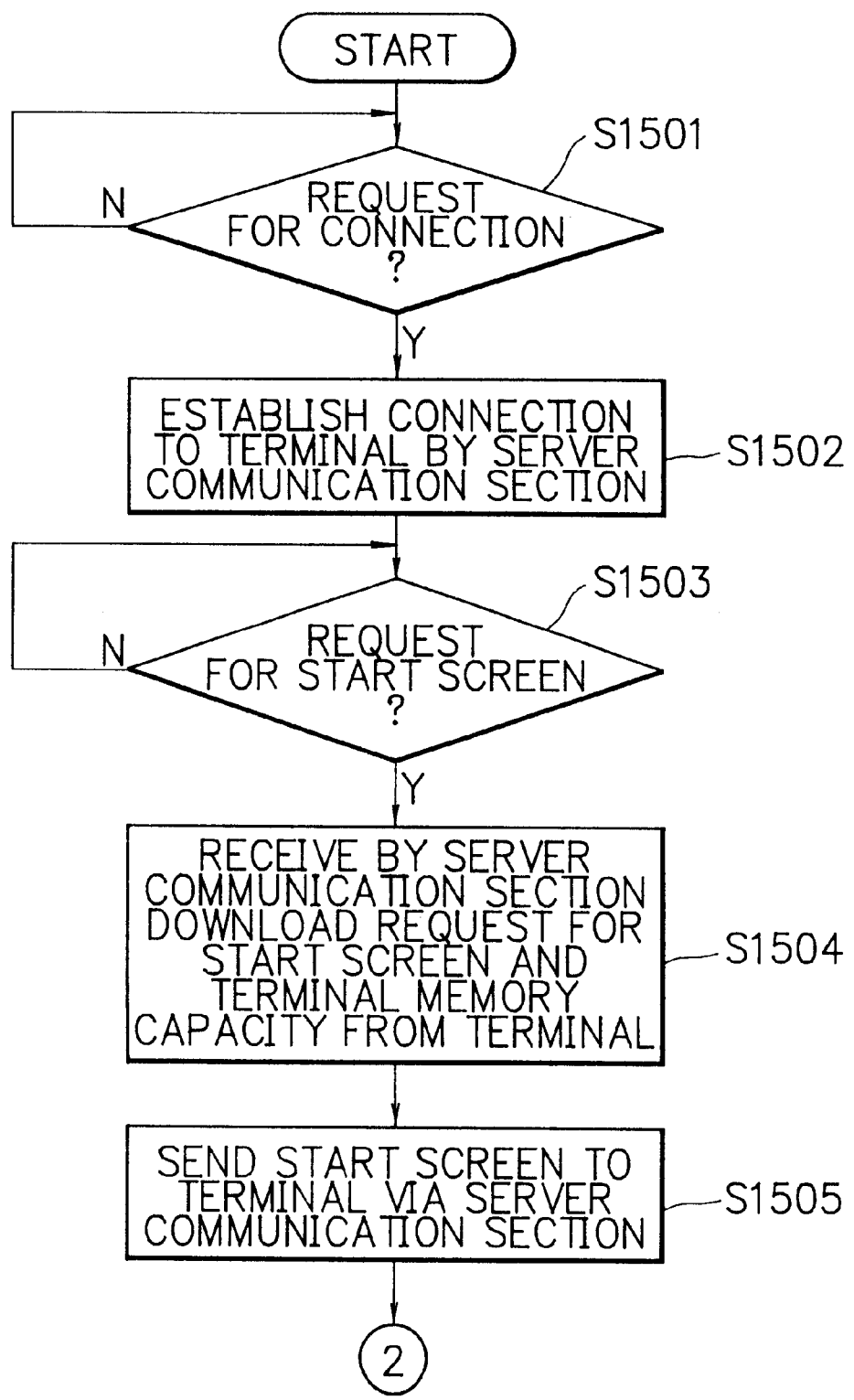
FIG. 13 is a flowchart showing the first-half portion of the operation of server control means to achieve the overall control operation of the server.

FIG. 13 shows a first-half portion of the processing flow of the server control means 122 supervising the overall operation of the server 121. On receiving a center connection request from the terminal 101 to establish connection to the server 121 (Y in step S1501), the controller 122 notifies acknowledgment of connection via the server communicating section 123 to the terminal 101 (step S1502). When the terminal 101 sends a screen download request for start menu 131 and the memory capacity available in the terminal memory 105 to the server 121 thereafter (Y in step S1503), the controller 122 receives these items (step 1504). The controller 122 then sends the screen of start menu 131 from the communication section 123 to the server 101 (step S1505).

FIG. 14 shows a last-half portion of the processing flow of the server controller 122. The control means 122 awaits an event in which a request from the terminal 101 is received by the server communicating section 123 (step S1506). When such a request is received (Y) and the request is a video request (Y in step S1507), the controller 122 accordingly adds one to the pertinent entry of the history table 126, namely, the number VC of user requests for the motion picture code file desired by the user (step S1508). Thereafter, the control means 122 sends the pertinent picture codes to the terminal 101 (step S1509) and then passes control to step S1506.

In contrast thereto, when the terminal 101 issues a request for a subsequent screen (Y in step S1510), the controller 122 responsively forecasts picture codes desired by the user (step S1511) and conducts preparation for transmission thereof (step S1512). The controller 122 then waits for a next request from the terminal 101 (step S1506).

When the request from the terminal 101 is other than those above, namely, a request for terminating the connection between the terminal 101 and the server 121 (N in step S1510), the controller 122 disconnects the connection to the terminal 101 (step S1513) and completely terminates the processing (End).

Figure 15:
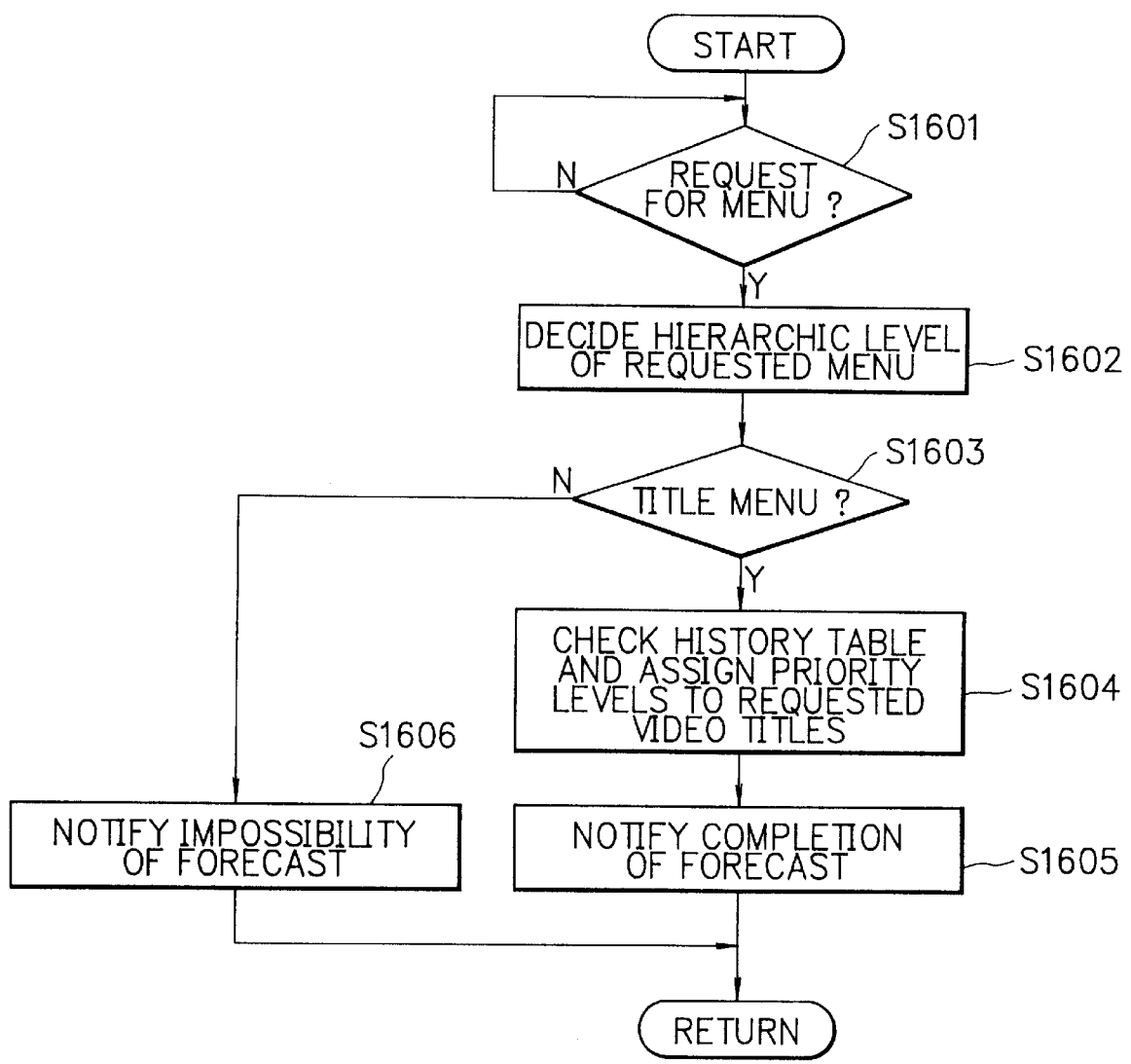
FIG. 15 is a flowchart showing operation of means for forecasting motion picture codes on the server side.

FIG. 15 shows the processing flow of the picture code forecasting means 127 on the side of server machine 121. The means 127 is provided so that a video requested by the user is forecasted on the server 121 side. When the terminal 101 issues a request for a menu screen (Y in step S1601), the forecasting means 127 decides a hierarchical level of the menu (step S1602). When the terminal 101 requests a title menu screen to select a title of a motion picture desired by the terminal 101 (Y in step S1603), the means 127 checks the history table 126 and assigns request priority levels to the requested video titles in the descending order in which videos are possibly requested (step S1604) and then notifies the completion of forecast to the terminal 101 (step S1605).

In contrast therewith, when the terminal 101 issues a request for other than the title menu screen (N in step S1603), the means 127 notifies the impossibility of forecast of picture codes to the terminal 101 (step S1606).

Figure 16:
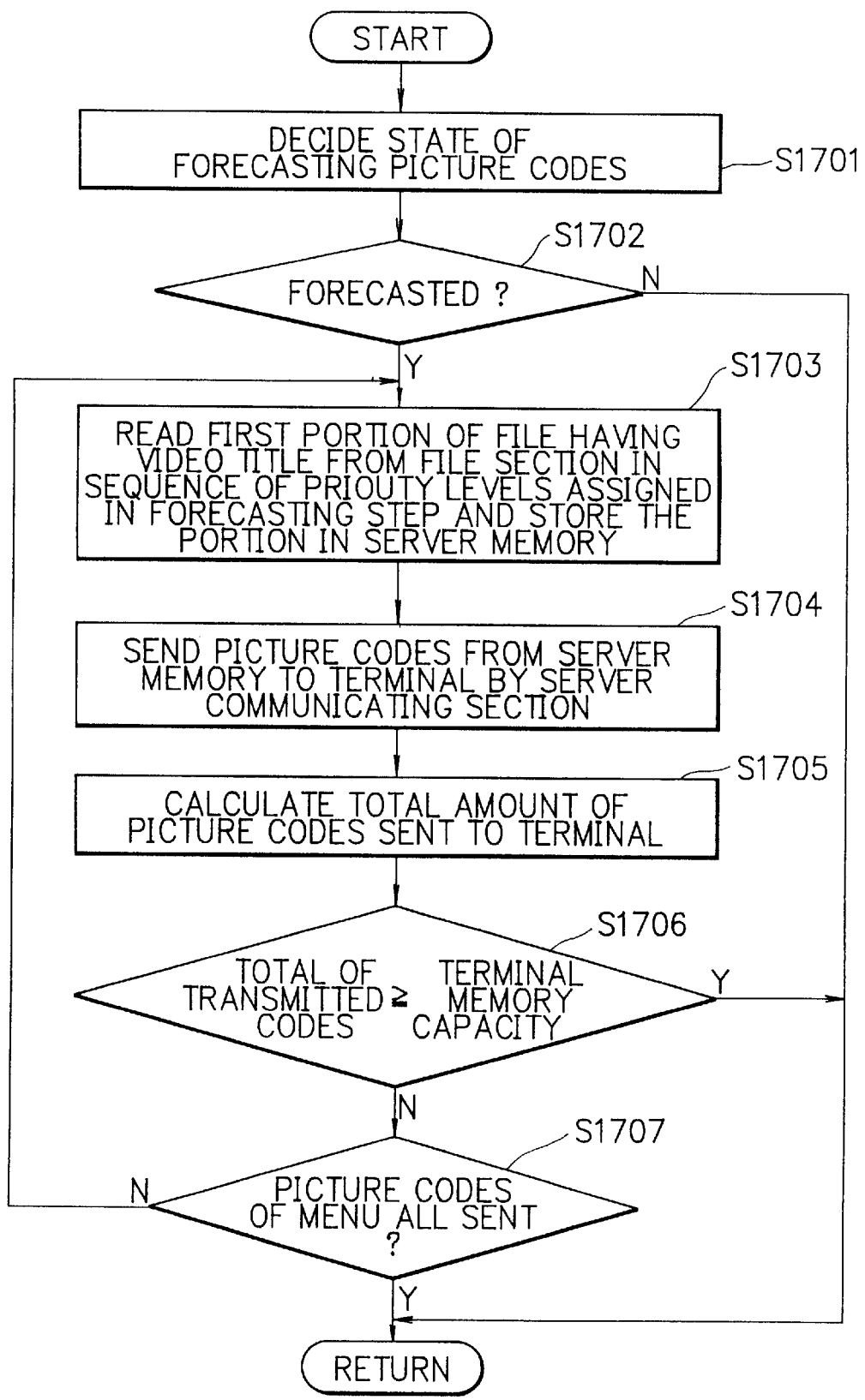
FIG. 16 is a flowchart showing operation of means for preparing transmission of motion picture codes on the server side.

FIG. 16 is a flowchart of operation of the code transmission preparing means 128. The means 128 is disposed to send moving picture codes forecasted by the server 121 to the terminal 101. The means 128 first checks the state of forecasting picture codes (step S1701). As a result, when it is determined that the forecast is successfully finished (Y in step S1702), control is passed to the immediately following step. Otherwise, (N in step S1702), the processing is terminated (Return).

In step S1703 after the forecast is successfully completed, the means 128 reads from the file section 125 a leading portion of the file of the associated video title in the order of priority levels assigned in the forecasting step and then stores the obtained portion in the server memory 124 (step S1703). Next, the means 128 sends the picture codes from the memory 124 via the server communication section 123 to the terminal 101 (step S1704). Thereafter, the means 128 calculates the total quantity of picture codes transmitted to the terminal 101 (step S1705). When it is found as a result that the total amount of the transmitted codes is equal to or more than the available capacity of terminal memory 105 notified from the terminal 101 (Y in step S1706), the means 128 terminates the processing (Return).

On the other hand, when the amount of transmitted codes is less than the memory capacity (N in step S1706), the means 128 decides whether or not the picture codes of the menu item are completely transmitted (step S1707). If there still remains any file having the video title to be transmitted (N in step 1707), control is passed to step S1703 to achieve the transmission process of the first portion of the file. In this fashion, when the capacity of terminal memory 105 is sufficient for transmission, the first portions of all files of the associated video titles are entirely sent to the terminal side 101. When this operation is completely executed (Y in step S1707), the processing is terminated (Return).

Figure 17:
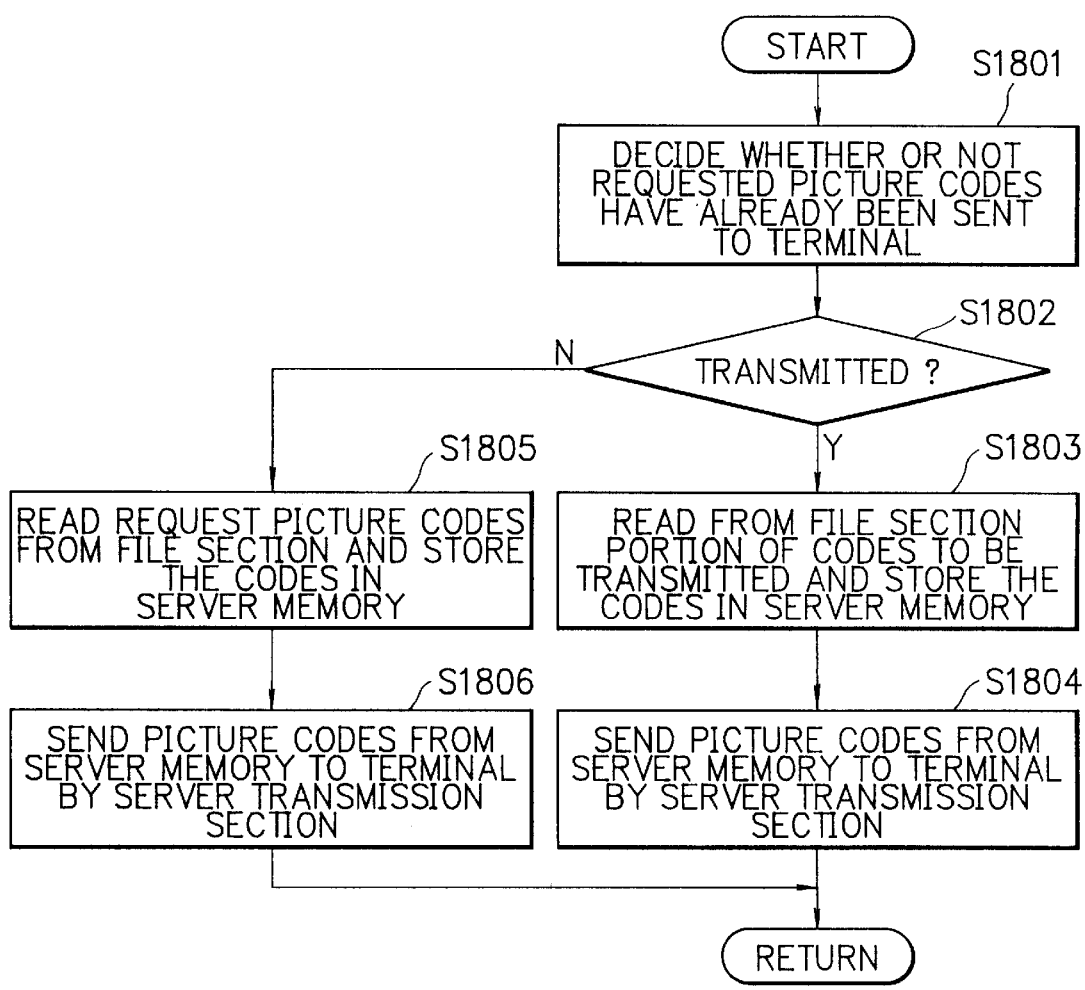
FIG. 17 is a flowchart showing operation of means for transmitting motion picture codes from the server side.

FIG. 17 shows the processing flow of the code transmitting means 129. The means 129 is provided to send motion picture codes forecasted by the server 121 to the terminal 101. The means 129 decides whether or not the requested codes have already been sent to the terminal 101 (step S1801). If the codes have been transmitted (Y in step S1802), the means 129 reads the remaining portion from the file section 125 and then stores the portion of codes in the server memory 124 (step S1803). The means 129 then activates the server transmitting section 123 to send the picture codes from the memory 124 to the terminal 101 (step S1804).

When it is decided in step S1802 that the codes are to be transmitted (N in step S1802), the means 129 reads the requested codes from the file section 125 and stores the codes in the memory 124 (step S1805). The means 129 then invokes the transmitting section 123 to transmit the codes from the memory 124 to the terminal 101 (step S1806).

Incidentally, in accordance with the embodiment, the desired video is selected by achieving switching operations between the menu screens. However, the menu screens need not be necessarily employed. Namely, the desired video can be similarly selected by other means such as tones and voices from video selecting information configured in a hierarchical structure. The present invention is also applicable to such cases.

As described above, in accordance with the first aspect, the range of videos for selection is sequentially narrowed in a direction from a coarser classification of videos to a finer classification thereof. From a plurality of videos remaining in a stage before a final video selection stage, there is or are forecasted according to a selection frequency thereof in the past one video or a plurality of videos for the pertinent selection. Consequently, an operation to obtain the forecasted video or videos can be commenced at this point of time. If the forecast is appropriate, the period of time lapsed from when the requested video is obtained to when the video is reproduced can be minimized when compared with a case in which the video is attained after the video selection is completely achieved for all videos.

Additionally, in the second aspect of the present invention, there is adopted categorized video selection frequency storage means in which a frequency of selecting operations of each video in the past is stored for each category of videos. When a category is specified, there is or are forecasted as a finally selected video or videos one video or a plurality of videos decided to have a highest selection frequency among videos belonging to the category. Therefore, the video can be obtained before the final video selection to prepare for transmission and reproduction of the video and hence the period of time consumed from when the requested video is obtained to when the video is reproduced can be decreased.

In the third aspect, a portion or all of videos forecasted by the video selection forecasting means is or are sent from a server side to a terminal side so that when a video is finally selected, the video can be immediately reproduced on the terminal side. Consequently, when portions of the forecasted videos are sent to the terminal, the period of time necessary for the transmission thereof is minimized. Furthermore, even when the memory capacity is limited on the terminal side, it is allowed to transmit portions of several candidate-videos to the terminal.

In addition, according to the fourth aspect, sent to the terminal is only a leading portion of each of the videos of which selection is forecasted. While the leading portion associated with the finally selected video is being reproduced, remaining portions of the video are transmitted to the terminal. This consequently minimizes the period of time lapsed by when the video is reproduced and enabling the continuous reproduction of the video.

Moreover, in the fifth aspect, since a receivable memory capacity available for reception of videos on the terminal side is notified from the terminal side to the server side, it is possible to appropriately send several forecasted videos in consideration of an overflow condition of the memory capacity.

In accordance with the sixth aspect, when the menu screen switching is conducted on the terminal side to narrow the video selection range, the terminal side sequentially issues a request to the server side for the screens. As a result, the operational load on the terminal side is mitigated and the video selection can be forecasted on the server side while recognizing the video selecting operation.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A motion picture retrieval system, comprising:

video selecting means for enabling selection of a desired video by sequentially narrowing a range of videos for selection in a direction from a coarser classification of videos to a finer classification thereof;

history information deciding means operative when a plurality of videos remain in a final video selection range as a result of operation of the video selecting means for deciding as history information for each of the videos a frequency of selecting operations for each of the videos in the past;

video selection forecasting means for forecasting, as a finally selected video or videos, one video or a plurality of videos decided to have a highest selection frequency as a result of operation of the history information deciding means;

forecasted video transmitting means for transmitting a portion or all of videos forecasted by the video selection forecasting means from a server side in which the videos are stored to a terminal side in which the transmitted videos are reproduced, the videos being transmitted before a final selection of videos is conducted; and motion picture reproduction preparing means for conducting preparation for reproduction of videos sent from the forecasted video transmitting means, wherein the forecasted video transmitting means transmits to the terminal side a leading portion of each of the videos of which selection is forecasted, wherein the forecasted video transmitting means transmits to the terminal side, when a final selection of videos is carried out, remaining portions of the finally selected videos while the leading portion associated with the selected video is being reproduced, wherein the terminal side notifies the server side, before the forecasted transmitting means transmits videos, a receivable memory capacity available for reception of videos on the terminal side, and wherein the forecasted video transmitting means adjusts the amount of transmission data of the videos to be transmitted according to the receivable memory capacity.

2. A motion picture retrieval system according to claim 1, wherein the server and terminal sides conduct bidirectional communication therebetween, wherein the video selecting means narrows the range of videos for selection by conducting a switching operation between menu screens, and wherein each of the menu screens is transmitted from the server side to the terminal side in response to a request from the terminal side.

3. A motion picture retrieval system, comprising:

categorized video selection frequency storage means for storing for each category of videos a frequency of selecting operations of each video in the past;

category specifying means for specifying a category of videos for selection;

video selection forecasting means operative when a category of videos for selection is specified by the category specifying means for forecasting, as a finally selected video or videos, one video or a plurality of videos decided to have a highest selection frequency among videos belonging to the specified category as a result of operation of the categorized video selection frequency storage means;

forecasted video transmitting means for transmitting a portion or all of videos forecasted by the video selection forecasting means from a server side in which the videos are stored to a terminal side in which the transmitted videos are reproduced, the videos being transmitted before a final selection of videos is conducted; and motion picture reproduction preparing means for conducting preparation for reproduction of videos sent from the forecasted video transmitting means, wherein the forecasted video transmitting means transmits to the terminal side a leading portion of each of the videos of which selection is forecasted, wherein the forecasted video transmitting means transmits to the terminal side, when a final selection of videos is carried out, remaining portions of the finally selected videos while the leading portion associated with the selected video is being reproduced, wherein the terminal side notifies the server side, before the forecasted transmitting means transmits videos, a receivable memory capacity available for reception of videos on the terminal side, and wherein the forecasted video transmitting means adjusts the amount of transmission data of the videos to be transmitted according to the receivable memory capacity.

4. A motion picture retrieval system according to claim 3, wherein the server and terminal sides conduct bidirectional communication therebetween, wherein the system further comprises video selecting means for sequentially narrowing a range of videos for selection in a direction from a coarser classification of videos to a finer classification thereof by conducting a switching operation between menu screens, and wherein each of the menu screens is transmitted from the server side to the terminal side in response to a request from the terminal side.

5. A method for sending video data from a particular server unit to a particular terminal unit that are connected to each other via a communication line, comprising the steps of:

a) determining, at the server unit based on historical information regarding selections of videos by a plurality of terminal units connected to the server unit, a selection frequency for each of a plurality of videos that are capable of being selected at the particular terminal unit;

b) receiving, at the server unit from the communication line, a request for menu information that was sent from the particular terminal unit;

c) sending, by the particular terminal unit over the communication line, data corresponding to the menu information requested by the terminal unit;

d) receiving, at the particular terminal unit over the communication line, menu information related to categories of videos that can be selected, the categories of videos being readable in a hierarchical menu structure having a plurality of hierarchies ranging from a highest level hierarchy to a lowest level hierarchy;

e) selecting, by a user at the particular terminal unit, a particular video category at the lowest level hierarchy;

f) sending, by the particular terminal unit over the communication line, information related to the particular video category;

g) sending, by the server unit over the communication line, data corresponding to a beginning portion of a particular video having a highest request rate among videos that are in the particular video category; and h) selecting, by the user at the particular terminal unit, one video for display at the particular terminal unit, wherein, when the selected one video is the same as the particular video, the beginning portion of the particular video is capable of being immediately displayed to the user at the particular terminal unit, and wherein, when the selected one video is not the same as the beginning portion of the particular video is not used, and the server unit sends a beginning portion of the selected one video for display at the terminal unit.

6. A method according to claim 5, further comprising the step of:

i) updating, by the server unit, the historical information stored at the server unit based on the selection made by the particular terminal unit in the step h).

\* \* \* \* \*